(12) United States Patent
Berkmo (10) Patent No.: US 11,053,023 B2
(45) Date of Patent: Jul. 6, 2021

(54) METHOD AND A SYSTEM FOR GUIDING A PILOT OF AN APPROACHING AIRCRAFT TO A STOP POSITION AT A STAND

(71) Applicant: ADB Safegate Sweden AB, Malmö (SE)

(72) Inventor: Anders Berkmo, Malmö (SE)

(73) Assignee: ADB SAFEGATE SWEDEN AB, Malmö (SE)

( * ) Notice: Subject to any disclaimer, the term of this patent is extended or adjusted under 35 U.S.C. 154(b) by 0 days.

(21) Appl. No.: 16/952,161

(22) Filed: Nov. 19, 2020

(65) Prior Publication Data

US 2021/0070467 A1    Mar. 11, 2021

Related U.S. Application Data

(63) Continuation of application No. PCT/EP2019/065796, filed on Jun. 17, 2019.

(30) Foreign Application Priority Data

Jun. 18, 2018  (EP) ..................................... 18178233

(51) Int. Cl.
*G08B 5/00* (2006.01)
*B64F 1/00* (2006.01)
(Continued)

(52) U.S. Cl.
CPC ........... *B64F 1/002* (2013.01); *G08G 5/0026* (2013.01); *G08G 5/065* (2013.01)

(58) Field of Classification Search
None
See application file for complete search history.

(56) References Cited

U.S. PATENT DOCUMENTS 5,675,661 A   10/1997  Richman et al.
5,889,479 A    3/1999  Tabel
(Continued)

FOREIGN PATENT DOCUMENTS

EP    1927965 A2   6/2008
EP    3222529 A1   9/2017
(Continued)

OTHER PUBLICATIONS

International Search Report and Written Opinion received for PCT Application No. PCT/EP2019/065796, dated Aug. 28, 2019, 12 pages.

(Continued)

*Primary Examiner* — Brent Swarthout
(74) *Attorney, Agent, or Firm* — Xsensus LLP (57) ABSTRACT

The disclosure relates to a method for guiding a pilot of an approaching aircraft to a stop position at a stand, said method being characterized by: monitoring a position of the approaching aircraft within a volume at the stand, comparing said monitored position with a first area, said first area enclosing the stop position, comparing said monitored position with a subsection of the first area enclosing the stop position, if said monitored position is inside said subsection: transmitting information to a display to show an indication to the pilot to proceed approaching the stand, and if said monitored position is inside the first area but not inside said subsection: transmitting information to the display to show an indication to the pilot to stop the aircraft. The disclosure further relates to an aircraft docking system.

13 Claims, 4 Drawing Sheets

(51) Int. Cl.
*G08G 5/00* (2006.01)
*G08G 5/06* (2006.01)

(56) References Cited

U.S. PATENT DOCUMENTS

| | | |
|---|---|---|
| 6,023,665 A | 2/2000 | Millgard |
| 6,100,964 A * | 8/2000 | De Cremiers .......... B64F 1/002 356/4.01 |
| 6,324,489 B1 | 11/2001 | Millgård |
| 6,563,432 B1 | 5/2003 | Millgård |
| 6,762,694 B2 | 7/2004 | Westlund |
| 8,612,130 B2 | 12/2013 | Thelander |
| 8,645,004 B2 | 2/2014 | Anderberg |
| 8,942,915 B2 | 1/2015 | Thelander |
| 2008/0157947 A1 | 7/2008 | Hutton |
| 2016/0376026 A1 | 12/2016 | Baudson et al. |

FOREIGN PATENT DOCUMENTS

| | | |
|---|---|---|
| WO | 01/35327 A1 | 5/2001 |
| WO | 2004/043785 A1 | 5/2004 |
| WO | 2017/119545 A1 | 7/2017 |

OTHER PUBLICATIONS

International Preliminary Report on Patentability received for PCT Application No. PCT/EP2019/065796, dated Apr. 15, 2020, 7 pages.
Extended European Search Report received for EP Application No. 18178233.5, mailed ondated Nov. 19, 2018, 10 pages.
Communication pursuant to Article 94(3) received for EP Application No. 18178233.5, dated Aug. 23, 2019, 5 pages.

* cited by examiner

METHOD AND A SYSTEM FOR GUIDING A PILOT OF AN APPROACHING AIRCRAFT TO A STOP POSITION AT A STAND

CROSS-REFERENCE TO RELATED APPLICATIONS

The present application is a bypass continuation of and claims priority to PCT/EP2019/065796, filed Jun. 17, 2019, which claims priority to European Patent Application No. 18178233.5, filed Jun. 18, 2018. The contents of these applications are incorporated herein by reference in their entirety.

FIELD OF THE INVENTION

The present invention relates to a method for guiding a pilot of an approaching aircraft to a stop position at a stand. The invention further relates to an aircraft docking system.

BACKGROUND ART

The greater demands on increased fuel economy have forced aircraft manufacturers to produce larger aircrafts to decrease fuel consumption per passenger seat. As airlines make corresponding changes to their fleets exchanging smaller aircrafts with larger ones, airports have been forced to develop means for efficiently and safely handling these larger aircrafts. As an example, many international airports have been forced to increase the length of the runway to be able to receive the Airbus A380.

The dimensions of the aircrafts also have an influence on the docking of aircrafts to a stand at the airport. In some cases, the infrastructure has to be rebuilt to accommodate for the physical dimensions of the aircrafts, but in other cases, the physical dimensions are enough for the aircrafts to fit. In the latter case, the problem may instead be related to achieving a safe docking of the aircrafts. Larger aircrafts have larger distance between their wheels, thus resulting in a larger turning radius. Moreover, the wing tip to wing tip distance is usually larger.

In general, safe and reliable docking of an aircraft to a stand is achieved by means of aircraft docking systems arranged locally at the stands of the airport, wherein each aircraft docking system is configured to aid the pilot, and sometimes also the ground crew, in receiving the aircraft at the stand in a safe and reliable way. Often, such aircraft docking systems comprise means for establishing a position of the aircraft as it approaches the stand, said means often being a remote sensing detection system, such as a laser scanning system or a radar based system. Typically, the aircraft docking systems known in the art are configured to analyze position data from the aircraft, and potentially also other input parameters, and, based on the parameters, make a decision whether to allow docking or not. Based on the decision, information is shown on a display at the stand in clear view of the pilot, instructing the pilot of which action to take.

Aircraft docking systems are known in the art.

As an example, WO 01/35327 A1 discloses an aircraft identification and docking guidance system utilizing a laser range finder (LRF) to identify an aircraft approaching a gate. The LRF is directed at the aircraft, and from the echoes, a profile is derived and compared to known profiles.

As another example, US 2008/157947 A1 discloses a radio frequency identification (RFID) tag-based system and method for guiding an aircraft to a stopping position. RFID tags are typically disposed in the ground and may be sensed by an RFID sensor disposed on the aircraft.

As yet another example, EP 3 222 529 A1 discloses an aircraft docking system comprising a light based verification and positioning system adapted to scan a volume in connection to a stand, wherein the light based verification and positioning system is further adapted to control the extension of the scanned volume based on the received surveillance data.

A problem with known methods and systems is that they are not adapted to handle the larger aircrafts of increasing importance today. Even if the physical dimensions of the aircrafts would fit the stand, the aircraft docking systems, and the methods implemented therein are not adapted to handle the docking in a correct way which may lead to high degree of interruptions during docking, or even accidents.

SUMMARY

It is an object to mitigate, alleviate or eliminate one or more of the above-identified deficiencies in the art and disadvantages singly or in any combination and solve at least the above mentioned problem.

According to a first aspect there is provided a method implemented in an aircraft docking system for guiding a pilot of an approaching aircraft to a stop position at a stand, wherein the aircraft docking system comprises a position monitoring system, a control unit, and a display, said method comprising:

the position monitoring system monitoring a position of the approaching aircraft within a volume at the stand, wherein said volume has a longitudinal extension along an approach direction towards an expected entrance position of the aircraft, the control unit comparing said monitored position with a first area, said first area enclosing the stop position and extending along the approach direction to define a front boundary facing the approaching aircraft, the control unit comparing said monitored position with a subsection of the first area, said subsection enclosing the stop position and extending along the approach direction to meet a portion of the front boundary of the first area, if said monitored position is inside said subsection of the first area:

the control unit transmitting information to the display to show an indication to the pilot of the approaching aircraft to proceed approaching the stand, if said monitored position is inside the first area but not inside said subsection of the first area:

the control unit transmitting information to the display to show an indication to the pilot of the approaching aircraft to stop the aircraft.

The fact that the subsection meets the front boundary of the first area implies that the subsection shares a portion of its boundaries with the front boundary of the first area.

Furthermore, statements that the monitored position is inside an area implies that the monitored position is found to be inside that area.

Thus, the method may be alternatively expressed as a method implemented in an aircraft docking system for guiding a pilot of an approaching aircraft to a stop position at a stand, wherein the aircraft docking system comprises a position monitoring system, a control unit, and a display, said method comprising:

the position monitoring system monitoring a position of the approaching aircraft within a volume at the stand, wherein said volume has a longitudinal extension along an approach direction towards an expected entrance position of the aircraft, the control unit comparing said monitored position with a first area, said first area enclosing the stop position and extending along the approach direction to define a front boundary facing the approaching aircraft, the control unit comparing said monitored position with a subsection of the first area, said subsection enclosing the stop position and extending along the approach direction to meet a portion of the front boundary of the first area, such that the subsection shares a portion of its boundaries with the front boundary of the first area, if said monitored position is found to be inside said subsection of the first area:

the control unit transmitting information to the display to show an indication to the pilot of the approaching aircraft to proceed approaching the stand, if said monitored position is found to be inside the first area but not inside said subsection of the first area:

the control unit transmitting information to the display to show an indication to the pilot of the approaching aircraft to stop the aircraft.

A lead-in line may extend from the stop position along the approach direction for providing further guidance to the pilot, and wherein said subsection of the first area is defined so as to encompass the portion of the lead-in line being inside the first area.

The method makes use of the underlying knowledge that an aircraft of certain dimensions and relative distances between its wheels has a predefined maneuverability. This means that, if an approaching aircraft enters the stand area in a certain way, the aircraft docking system does not need to know exactly how the aircraft is located in relation to the stand. One position of the aircraft, such as the position of the nose of the aircraft, is enough for the aircraft docking system to be able to predict whether or not the aircraft is likely to succeed an attempted approach to the stand. The decision is taken after the aircraft has entered the first area. Then, dependent on which portion of the first area in which the monitored position of the aircraft is entering (i.e. inside or outside the subsection of the first area), the decision may be taken to allow or stop an approach.

The method may be advantageous as it allows for providing a safer docking, especially for aircrafts of larger dimensions or automated safety from a wing clearance perspective at any stand designed for any aircraft dimensions, i.e. two adjacent narrow-bodied stands. According to the standards of ICAO and EASA, the wing tip clearance between neighboring aircrafts must be 7.5 meters unless the stand areas are monitored by aircraft docking systems to assist in the parking. Thus, as the disclosed method further increases the control of the approach and reduces the risk of collisions, the disclosed method may allow for new, larger, types of aircrafts to be parked at stands originally not designed and constructed to house such aircraft types. Furthermore, the method may be advantageous in situations where an aircraft for some reason has entered a stand area along a wrong lead-in line. The pilot may attempt to adjust the course of the aircraft to compensate, but in some cases the attempt may be unsuccessful, as the dimensions of the aircraft is too large for successful repositioning within the area available.

This is a result from a lowering of the risk of the aircraft coming too close to, or even crashing into, neighboring objects on its way to the stand. Moreover, the method may allow for a more flexible docking methodology at the airport. The flexibility has much to do with the ease by which the first area and the subsection thereof may be redefined dependent on the situation. Even if the infrastructure at an airport stand to some degree is fixed, and may be considered predefined, some parts of the infrastructure are not, such as e.g. a movable airport boarding bridge. By adjusting the first area and/or the subsection thereof, structural changes at the stand area may be accounted for. Furthermore, at stands designed with multiple lead-in lines for aircrafts approaching from different directions and/or for different types of aircraft, the system may adjust the first area and the subsection thereof dependent on which of the lead-in lines the approaching aircraft is assigned to follow. Should the pilot mistakenly drive the aircraft following the wrong lead-in line, the aircraft may enter the first area outside of the subsection of the first area, whereby the pilot would be instructed to stop the aircraft.

The first area is defined so as to enclose the stop position. The first area may also enclose a portion of the lead-in line. The first area then extends along the approach direction. The approach direction may coincide with the direction of a linear portion of the lead-in line in the vicinity of the stop position. The first area defines a front boundary facing the approaching aircraft. The first area may be geometrically easy to define, such as a rectangle. In such a case, the first area will have four sides, one of which being the front boundary. The first area may, however, have any shape.

The subsection of the first area encloses the stop position and extends along the approach direction to meet a portion of the front boundary of the first area. The subsection may further enclose a portion of the lead-in line. In some embodiments, the subsection encloses the whole portion of the lead-in line enclosed by the first area. The subsection may be rectangular-shaped and defined symmetrically in relation to the lead-in line. The subsection shares a portion of its boundaries with the first area. This implies that the shared portion is a portion of the front boundary.

The second area is defined outside of the first area. The second area thus extends outwardly from the front boundary of the first area. The second area defines a front boundary of its own. The front boundary of the second area also faces the approaching aircraft. However, as the second area is disposed further from the position monitoring system than the first area, the approaching aircraft will first cross the front boundary of the second area to enter the second area, and, later, pass the front boundary of the first area to enter the first area. The first area and the second area share a portion of their boundaries. In some embodiments, the second area shares a portion of its boundaries corresponding to the front boundary of the first area. This implies that the first area and the second area may be in abutment with each other all along the front boundary of the first area.

It is understood that the size and position of the first area and the size and position of the subsection thereof will have to be determined before docking, as this information forms part of the basis for the decision of what information to present on the display. This implies that the control unit may be configured to receive identification data pertaining to the type of the approaching aircraft. Using the identification data, the aircraft docking system may determine the dimensions of the aircraft for example from a database at the airport with which database the aircraft docking system is operatively connected. It is also conceivable that the aircraft docking system has dimensions of aircraft types stored locally. The aircraft docking system may for example have predefined coordinates of the first area and the subsection thereof stored in a memory of the aircraft docking system, thus allowing for the control unit to retrieve, from said memory, corresponding coordinates for a particular aircraft type. Thus, the first area and the subsection thereof may differ between different aircrafts, different stands, different approach directions etc. For example, if a Boeing 747 is approaching a particular stand from a left side, the dimensions and positions of the first area and subsection thereof will be different than if an Airbus A380 is approaching the same stand from a right side. The extension of the first area and/or the extension of the subsection of the first area may be determined based upon one or more from the list of: dimensions of an aircraft expected to approach the stand, dimensions of the aircraft approaching the stand, dimensions of aircrafts at neighboring stands, a direction from which an aircraft approaches the stand area, and a lead-in line assigned to the approaching aircraft.

According to some embodiments, determining the extension of the subsection (140a) of the first area (140) includes determining a lateral dimension and/or a longitudinal dimension thereof, said dimensions being determined such that sufficient clearance is provided to the approaching aircraft (10).

Both the lateral dimension and the longitudinal dimension of the subsection of the first area may be important. Said dimensions are typically determined individually depending on the layout at the stand area, the aircraft types expected to arrive at the stand etc. Other factors influencing the determination of the dimensions may be how the taxiway physically relates to the stand and/or how a lead-in line is arranged. For example, a lead-in line may define a relatively sharp 90-degree turn in a transition area between the taxiway and the stand area. Alternatively, a lead-in line may define a less sharp turn at a less sharp angle. Other factors that may influence the determination of said dimensions is the presence of fixed infrastructure at the stand area, such as e.g. lighting masts, service roads, assigned areas for storing equipment, etc. Thus, the dimensions may have to be determined individually for each stand.

It is conceivable that the lateral dimension is of higher importance than the longitudinal dimension for establishing an acceptable clearance in relation to neighboring stands and the aircraft types expected to arrive at the neighboring stand.

It is conceivable that the longitudinal dimension is of higher importance than the lateral dimension for regulating how far into the docking procedure the approaching aircraft is allowed to come before docking is abandoned.

It is conceivable that the lateral dimension and/or the longitudinal dimension are determined based on a simulation of aircraft approaches and docking procedures at a specific stand area so as to determine optimized values of the lateral and longitudinal dimensions thereof. More than a lateral and longitudinal dimension may be used. For example, the subsection of the first area may have a varying lateral dimension. In such a case, more than one value of a lateral dimension may be determined.

Moreover, the extension of the first area and/or the extension of the subsection of the first area may be adjusted during an approach of the aircraft. This may allow for a more flexible method for example in situations where the approaching aircraft was found to be of a different type than expected, or if objects unintentionally enter, or are repositioned, on the stand area during approach of the aircraft. Thus, it may also be necessary to adjust extension of the first area and/or the extension of the subsection of the first area. The adjusting of the extension(s) is determined based on one or more from: dimensions of aircrafts at neighboring stands, positions of aircrafts at neighboring stands, and the monitored position of the approaching aircraft (10).

According to some embodiments, the monitored position pertains to the position of the nose of the approaching aircraft. This may be advantageous as it provides a robust and fast way of establishing a position. The nose will be entering the monitored area first and may be detected at an early stage. Moreover, the nose is, for reasons of symmetry, possible to relate to the lead-in line.

According to some embodiments, the method further comprises if said monitored position is found to be inside said subsection of the first area: determining, based on said comparison, a lateral deviation from an expected position within said subsection, and the control unit transmitting information pertaining to said relative deviation to the display to show an indication to the pilot to adjust the course of the aircraft during approach to the stand. The lateral deviation may be a lateral distance between the monitored position and the lead-in line.

This may be advantageous as it allows for further optimizing the approach to the stop position of the stand. Thus, even in a case where the approaching aircraft is allowed to approach the stand, as determined by the monitored position being within the subsection of the first area, the aircraft is not necessarily aligned along the lead-in line in an optimal way. By allowing the system to continue guiding the pilot towards the stopping position, the parking may be improved. Furthermore, the risk is lowered that the aircraft moves such that the monitored position of the aircraft moves from the subsection of the first area to a subsection outside of the first area, at which the aircraft docking system would instruct the pilot to stop.

According to some embodiments, the method further comprises: the control unit comparing said monitored position with a second area, said second area extending outwardly from the front boundary of the first area to define a front boundary of the second area, if said monitored position is found to be inside the second area: determining, based on the comparison, a lateral deviation from an expected position within said second area, and the control unit transmitting information pertaining to said relative deviation to the display to show an indication to the pilot to adjust the course of the aircraft during approach to the stand.

By adding the second area outside of the first area and allowing the docking system to, in the second area, actively guide the pilot towards a specific entrance position to the first area, the method will further improve the approach of the aircraft. The aircraft may thus be better prepared for entering the first area. While the monitored position is within the second area, there is no attempt to stop the aircraft. Instead, the pilot is given a chance to correct the approach path so that the monitored position of the approaching aircraft enters the subsection of the first area.

It is also conceivable that two or more values of the monitored position are used as a basis for the decision. For example, the control unit may be arranged to monitor the position of the approaching aircraft continuously, so as to provide a line of positions. The control unit may be arranged to analyze the line of positions in different ways. For example, the control unit may be arranged to calculate a time derivative of a lateral distance with respect to a lead-in line. If said derivative of the lateral distance exceeds a threshold, indicating a too sudden shift in the direction of the aircraft, the control unit may be arranged to transmit information to the display to show an indication to the pilot of the approaching aircraft to decrease the speed, or, alternatively, stop approaching the stand. This may be carried out when the monitored position is within the subsection of the first area.

It is also conceivable that the line of positions inferred from the continuous monitoring of the position of the approaching aircraft is used to calculate the forward speed of the aircraft. The speed may then be used in different ways. For example, the first area and/or the subsection thereof may be adjusted as a function of the calculated speed. It may be an advantage to decrease the size of the subsection of the first area as a function of increasing speed, so as to lower the risk of collisions.

According to some embodiments, the position monitoring system is a laser-based position monitoring system adapted to continuously scan the volume at the stand, said volume covering at least the first area. The position monitoring system may, alternatively or additionally, comprise radar sensors, imaging sensors, ultrasonic sensors or the like.

According to a second aspect there is provided a computer-readable medium comprising computer code instructions which when executed by a device having processing capability are adapted to perform the method according to the first aspect.

According to a third aspect there is provided an aircraft docking system for guiding a pilot of an approaching aircraft to a stop position at a stand, the aircraft docking system comprising:

a position monitoring system arranged to monitor a position of an approaching aircraft within a volume at the stand, wherein said volume has a longitudinal extension along an approach direction towards an expected entrance position of the aircraft, a display for providing instructions to the pilot of the approaching aircraft, and a control unit operatively connected to the position monitoring system and the display, wherein the aircraft docking system is configured to perform the method according to the first aspect.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

Terminology

The term "lead-in line" should be interpreted as a guide path for the pilot for a specific approach. Typically, lead-in lines are marked on the ground by a painted line. A stand may, however, have more than one lead-in line. For example, a stand may have different lead-in lines for planes arriving from different directions, so as to decrease the angle the plane has to turn at, or close to, the stand area.

The phrases used in the inequalities of claim 1, i.e. that the monitored position being either inside, or outside, of an area, should be interpreted broadly. The monitored position may be anywhere within the monitored volume at the stand. Thus, the monitored position may include a vertical component (e.g. the height of the nose of the aircraft). The monitored position should be interpreted as being inside an area when the orthogonal projection of the monitored position falls within the area (i.e. when the monitored position is located over the area), and outside the area when the orthogonal projection of the monitored position is not within the area.

The term "stop position" should be interpreted as a specific position, or coordinate, at the stand towards which the pilot is guided during approach. Thus, the stop position is not the same as the position of the aircraft itself. Usually, the stop position is close to the front wheel of the aircraft. The stop position may be marked on the stand area. However, this is not always the case. For example, different aircraft types may have different stop positions. The aircraft docking system may thus determine the stop position when receiving the information of aircraft type.

BRIEF DESCRIPTIONS OF THE DRAWINGS

The invention will by way of example be described in more detail with reference to the appended [schematic] drawings, which shows presently preferred embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
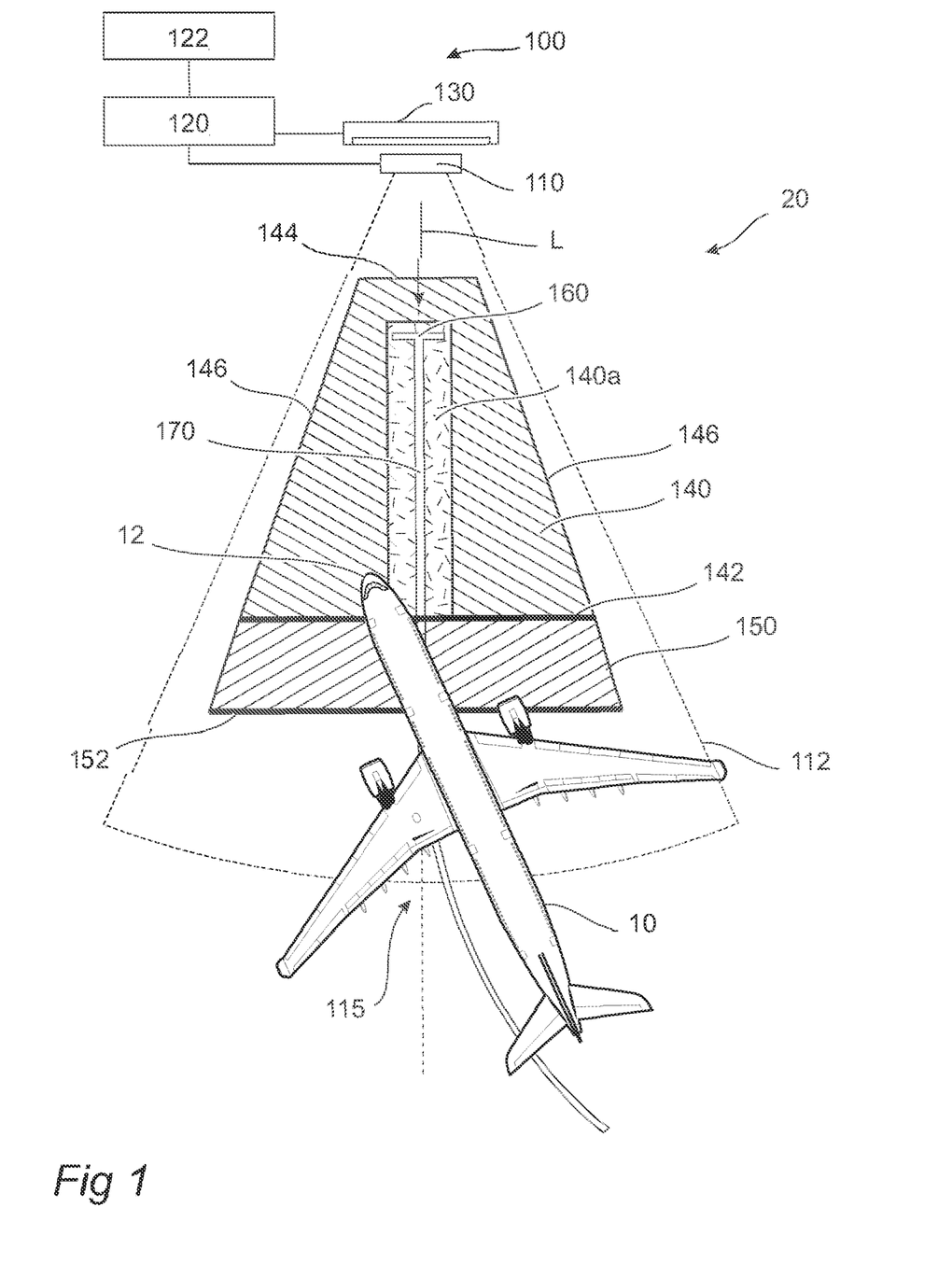
FIG. 1 shows a schematic top view of an aircraft docking system during approach of an aircraft according to embodiments of the present disclosure.

FIG. 1 shows an aircraft docking system 100 according to an example embodiment. The aircraft docking system 100 comprises a position monitoring system 110 being arranged to monitor a position of the approaching aircraft 10 within a volume 112 at the stand 20. The position monitoring system 110 is a laser-based position monitoring system adapted to continuously scan the volume 112 at the stand 20. A laser beam is emitted from the position monitoring system 110 e.g. via a vibrating mirror arrangement or an acousto-optic modulator, whereby the beam is scanned repeatedly over the entire volume 112. Back reflections from the beam are monitored by an optical detector of the position monitoring system and the position may be inferred from analyzing the back-scattering signal. The laser-based position monitoring system 110 is adapted to scan the nose 12 of the aircraft 10. Thus, the monitored position 112 of the approaching aircraft 10 pertains, in the example, to the position of the nose 12 of the approaching aircraft 10.

As can be inferred from FIG. 1, the position monitoring system 110 is here positioned symmetrically along the extension of the lead-in line, behind the stop position 160. The position monitoring system 110 may be mounted directly on a wall of the airport terminal building to which the stand belongs. The monitored volume 112, here scanned by the laser beam, extends outwardly from the position monitoring system 110 towards the approaching aircraft. Expressed in other words, the monitored volume 112 has a longitudinal extension along an approach direction L towards an expected entrance position 115 of the aircraft 10. The range is typically 60-110 m dependent on the stand.

The aircraft docking system 100 further comprises a display 130 for providing instructions to the pilot of the approaching aircraft 10. The display is here also mounted on the wall of the terminal building at a vertical position where the display 130 is in clear view of a pilot of the approaching aircraft 10.

The aircraft docking system 100 further comprises a control unit 120 operatively connected to the position monitoring system 110 and the display 130. The control unit 120 is further operatively connected to a database 122. The database 122 may be an airport operational database AODB comprising flight plans of arriving and departing aircrafts. This way, the control unit 120 may access information pertaining to the type of aircraft which will be approaching the stand 20. The control unit 120 may also be in direct communication with the approaching aircraft 10, for example via ADS-B. In such a case, the control unit may receive the type of aircraft directly from the aircraft 10 instead of via the database 122.

At the stand area, a lead-in line 170 extends from a stop position 160 disposed at a distance from the position monitoring system 110, along the approach direction L. The purpose of the lead-in line 170 is to provide guidance to the pilot when maneuvering the aircraft 10 to a parking position at the stand 20. The lead-in line 160 is typically painted in yellow according to the ICAO Aerodrome Design Manual so as to be clearly visible to the pilot during approach.

A method implemented in the aircraft docking system 100 will now be described. The method is based upon a comparison between the monitored position of the aircraft 10 and coordinates of the stand area defining different areas covering parts of the stand area. To make the description of the method easier to follow, these areas will first be defined with reference to FIG. 1.

A first area 140 is defined so as to enclose the stop position 160. The first area thus also encloses a portion of the lead-in line 170. FIG. 1 shows one example embodiment of the first area 140. As can be seen, the first area 140 has an innermost boundary 144 which faces the position monitoring system 110. The first area 140 then extends along the approach direction L (i.e. in the direction of the lead-in line 170) to define a front boundary 142 facing the approaching aircraft 10. The first area 140 further has two side boundaries 146, which connect the innermost boundary 144 and the front boundary 142 with each other.

The first area 140 has a subsection 140a which encloses the stop position 160 and extends along the approach direction L to meet a portion of the front boundary 142 of the first area 140. The subsection 140a further encloses a portion of the lead-in line 170. In the example, the subsection 140a encloses the whole portion of the lead-in line 170 enclosed by the first area 140. In the example, the subsection is rectangular-shaped and defined symmetrically in relation to the lead-in line 170. The subsection 140a shares a portion of its boundaries with the first area 140. The shared portion is a portion of the front boundary 142.

A second area 150 is defined outside of the first area 140. The second area 150 thus extends outwardly from the front boundary 142 of the first area 140. The second area 150 defines a front boundary 152 of its own. The front boundary 152 of the second area 150 also faces the approaching aircraft 10. However, as the second area 150 is disposed further from the position monitoring system 110 than the first area 140, the approaching aircraft 10 will first cross the front boundary 152 of the second area 150 to enter the second area, and, later, pass the front boundary 142 of the first area 140 to enter the first area 140. The first area 140 and the second area 150 share a portion of their boundaries. In the example, the second area 150 shares a portion of its boundaries corresponding to the front boundary 142 of the first area 140. This means that the first area 140 and the second area 150 are in abutment with each other all along the front boundary of the first area.

Figure 2:
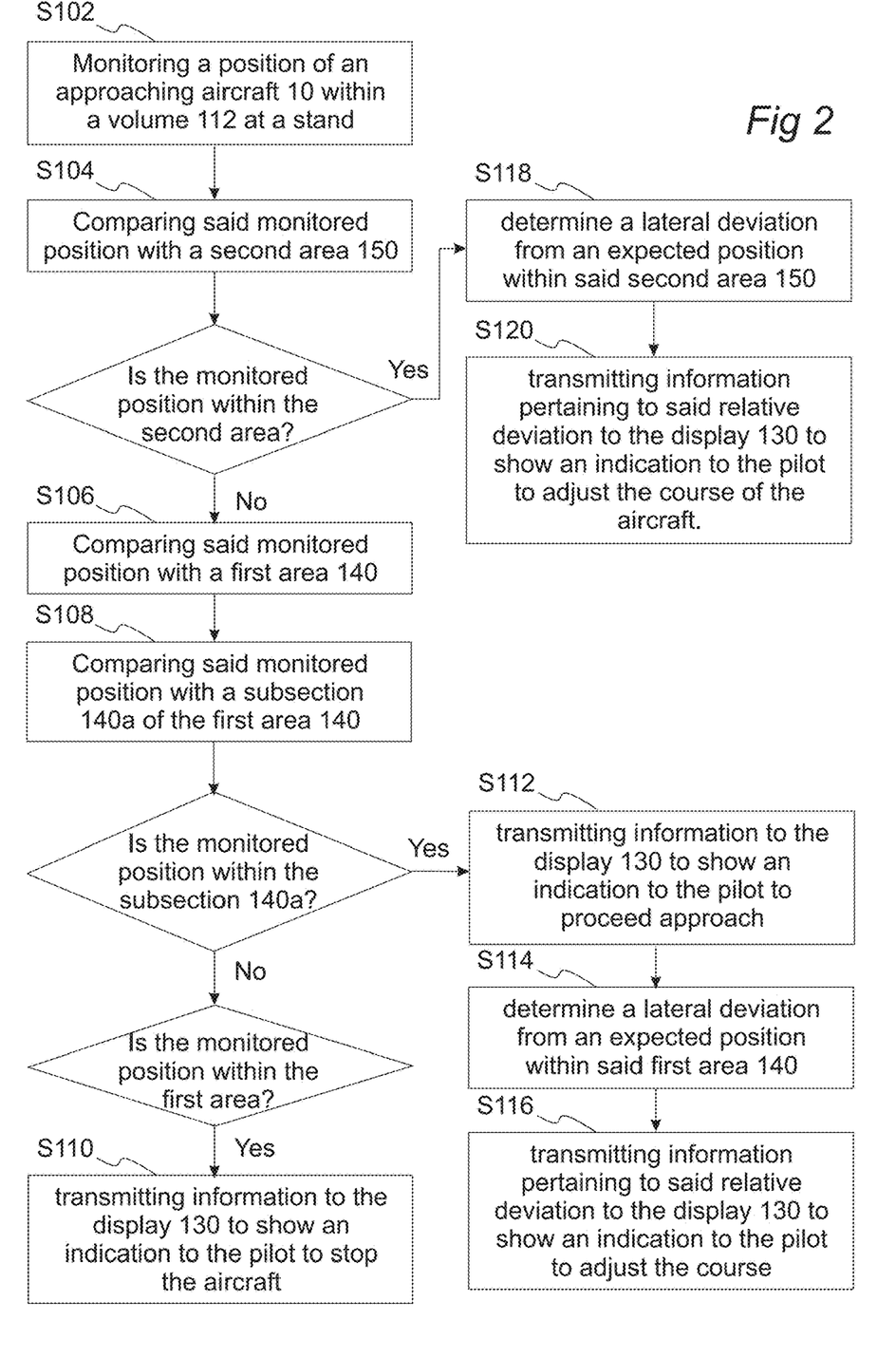
FIG. 2 shows a flow chart of a method for guiding a pilot of an approaching aircraft to a stop position at a stand according to embodiments of the present disclosure.

FIG. 2 shows a method implemented in an aircraft docking system for guiding a pilot of an approaching aircraft 10 to a stop position 160 at a stand 20. The method will here, by way of example, be described with reference to the aircraft docking system 100 described hereinbelow. However, it is understood that the method is equally applicable for other aircraft docking systems within the scope of the appended claims.

The position monitoring system 110 continuously monitors S102 a position of the approaching aircraft 10 within a volume 112 at the stand 20. The continuous monitoring may be initiated just prior to the aircraft 10 appearing within the monitored volume 112. For example, the monitoring may be initiated as a result from the control unit 120 receiving information from the aircraft 10 and/or a control tower and/or an airport surveillance system that the aircraft 10 is about to approach the stand 20.

The control unit 120 then compares S104 said monitored position with the second area 150 (already defined and discussed hereinabove). If said monitored position is inside the second area 150, the control unit 120 determines S118 a lateral deviation from an expected position within said second area 150. The expected position may be defined by a predefined preferred transport path across the second area 150. Such preferred transport paths may be unique for each aircraft type and/or different lead-in lines of the stand 20. The preferred transport path may be aligned with a lead-in line.

The control unit 120 then transmits S120 information pertaining to said relative deviation to the display 130 to show an indication to the pilot to adjust the course of the aircraft 10 during approach to the stand 20. The indication may comprise showing signs of directions, such as e.g. arrows on the display 130.

At this stage, the aircraft 10 has entered and passed across the second area 150, i.e. the outer area furthest away from the stop position 160. The aircraft 10 will then pass over the front boundary 142 of the first area 140 and enter inside the first area 140. At a particular moment, the monitored position will then shift from being inside the second area 150 to being inside the first area 140. This shift will be picked up by the control unit 120 as it continuously compares S106 said monitored position with the first area 140. The control unit 120 further compares S108 the monitored position with the subsection 140a of the first area 140. If the monitored position is found to be inside the subsection 140a of the first area 140, the control unit 120 transmits S112 information to the display 130 to show an indication to the pilot of the approaching aircraft 10 to proceed with approaching the stand 20. Moreover, the control unit 120 determines S114, based on said comparison, a lateral deviation from an expected position within the subsection 140a and transmits S116 information pertaining to the relative deviation to the display 130 to show an indication to the pilot to adjust the course of the aircraft 10 during approach to the stand 20. Thus, if the aircraft 10 is entering the subsection 140a of the first area 140, the process of providing course directions to the pilot that already was initiated in the second area 150 continues also in the subsection 140a of the first area 140.

If, however, the monitored position is found to be inside the first area 140 but not inside the subsection 140a of the first area 140, the control unit 120 transmits S110 information to the display 130 to show an indication to the pilot of the approaching aircraft 10 to stop the aircraft 10. Thus, if the monitored position is found to be outside of the subsection 140a of the first area 140 but within the first area 140 as such, the aircraft is deemed to be so far of course that safe docking will not be possible. The automatic docking procedure is hereby halted. In some cases, it is conceivable to reinstate automatic docking. The aircraft 10 may for example be towed backwards to a more promising starting position for approach, whereby the aircraft 10 is yet again allowed to approach the stand 20 guided by the aircraft docking system 100. In other cases, automatic docking will be abandoned and the docking will instead be carried out manually. The decision will depend on the situation.

The extension of the first area 140 and/or the extension of the subsection 140a of the first area 140 may be determined based upon a number of different factors, such as e.g. dimensions of an aircraft expected to approach the stand, dimensions of the aircraft 10 approaching the stand, dimensions of the aircrafts at neighboring stands, an approach direction from which the aircraft 10 approaches the stand area, a lead-in line assigned to the approaching aircraft 10. As previously mentioned, the aircraft docking system 100 may obtain such information in advance from another entity at the airport, such as a control tower, an airport surveillance system, an airport operational database (AODB), the approaching aircraft 10 itself, other aircrafts etc. The extension of an area may be different for different aircraft types, different approach directions, different weather and so on. The system is thus powerful in the sense that it is capable of adjusting to the situation at hand. The extension of the first area 140 and/or the extension of the subsection 140a of the first area 140 can also be adjusted during an approach of the aircraft 10. This means that the definitions of the area boundaries may be adjusted during the process of docking. This may be necessary for example when another object moves within the stand area. Such an object may for example be a neighboring aircraft.

Figure 3:
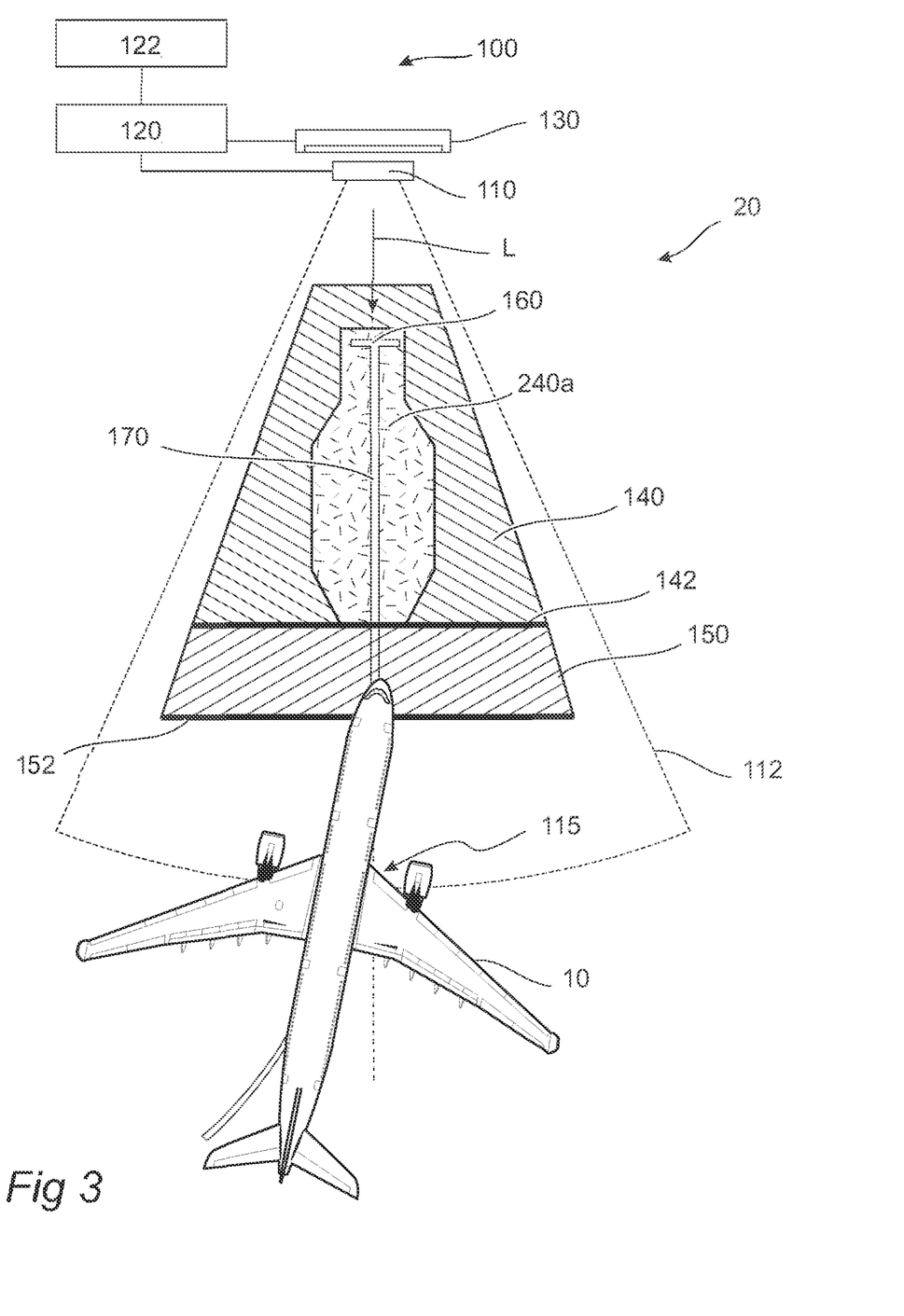
FIG. 3 shows a schematic top view of an aircraft docking system during approach of an aircraft according to other embodiments of the present disclosure.

The extensions of the first and second areas may be different from what has been described hereinabove. FIG. 3 shows an example identical to the example shown in FIG. 1 with the exception that the extension of the subsection 240a of the first area 140 is different. As can be seen in FIG. 3, the subsection 240a of the first area 140 has a varying lateral extension. The example embodiment shows a way of allowing a varying tolerance for misalignment across the first area 140. It is understood that the shape may be varied in different ways.

Figure 4:
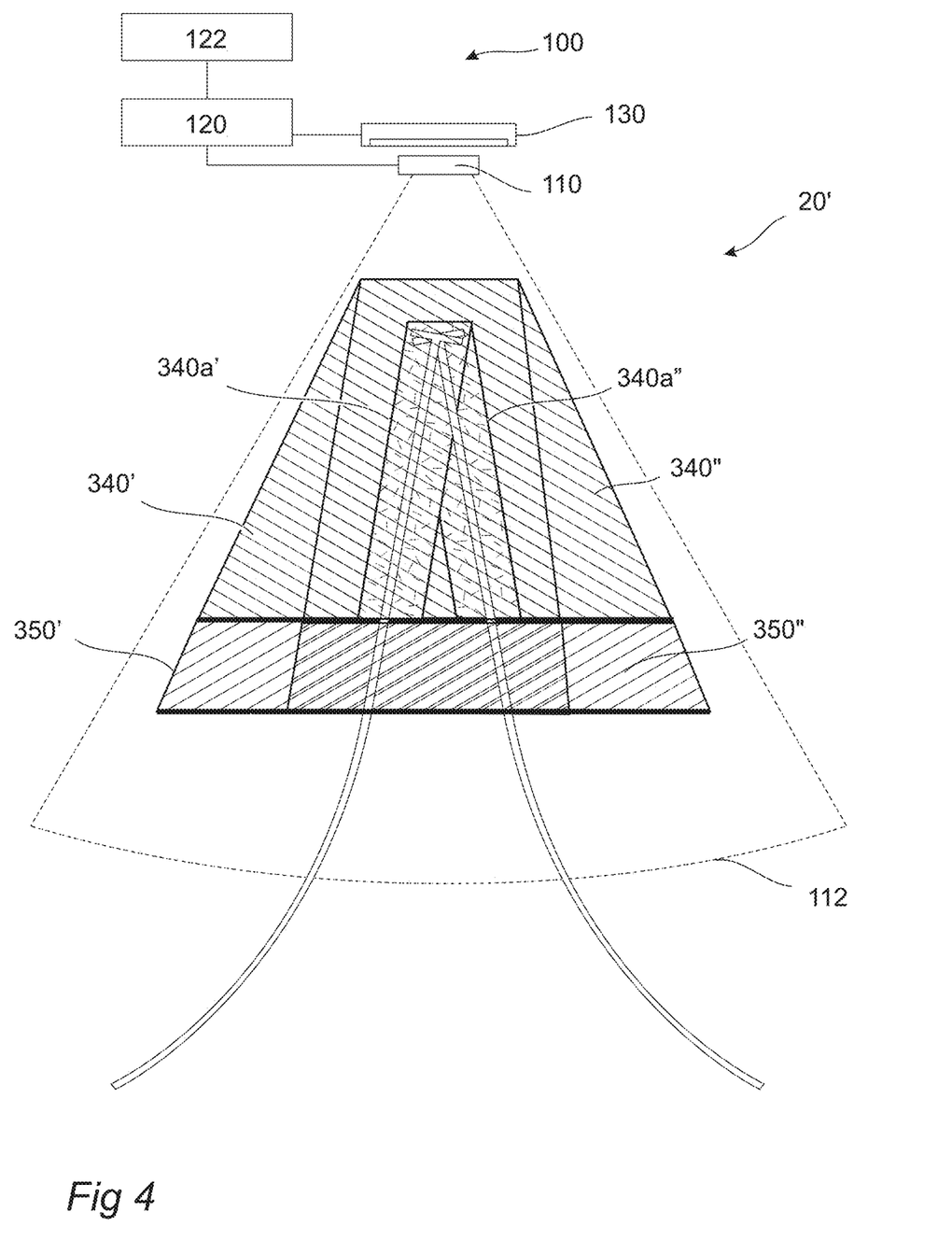
FIG. 4 shows a schematic top view of an aircraft docking system during approach of an aircraft according to yet other embodiments of the present disclosure.

FIG. 4 shows an example embodiment where the stand 20' has two lead-in lines and hence at least two sets of first areas 340', 340" and subsections 340a', 340a" and second areas 350', 350". In the example the scanned volume 112 is the same for the two different sets of areas. It is also conceivable that the scanned volume is shifted to the side so as to better receive the approaching aircraft.

The person skilled in the art realizes that the present invention by no means is limited to the preferred embodiments described above. On the contrary, many modifications and variations are possible within the scope of the appended claims.

For example, there may be further areas which may determine actions of the control unit. In the disclosure, the main action taken by the control unit is to allow the display to show a message to the pilot to stop the aircraft. There are, however, some parts of the first area outside of the subsection which are worse than others. A further subsection of the first area may then be defined covering laterally distal portions of the first area. In case a monitored position would be found to be inside the further portion, further actions may be taken in addition to show the stop indication, for example, sounding an alarm, signaling to ground crew, signaling to rescue units etc.

The invention claimed is:

1. A method implemented in an aircraft docking system for guiding a pilot of an approaching aircraft to a stop position at a stand, wherein the aircraft docking system comprises a position monitoring system, a control unit, and a display, the method comprising:

monitoring, by the position monitoring system, a position of the approaching aircraft within a volume at the stand, the volume having a longitudinal extension along an approach direction towards an expected entrance position of the aircraft;

comparing, by the control unit, the monitored position with a first area, the first area enclosing the stop position and extending along the approach direction to define a front boundary facing the approaching aircraft, and a size and a position of the first area being determined based on identification information of the approaching aircraft;

comparing, by the control unit, the monitored position with a subsection of the first area, the subsection enclosing the stop position and extending along the approach direction to meet a portion of the front boundary of the first area, and a size and a position of the subsection being determined based on identification information of the approaching aircraft, wherein the subsection shares a portion of its boundaries with the first area, the shared portion being a portion of the front boundary of the first area;

transmitting, by the control unit, information to the display to show an indication to the pilot of the approaching aircraft to proceed approaching the stand, when the monitored position is found to be inside the subsection of the first area; and transmitting, by the control unit, information to the display to show an indication to the pilot of the approaching aircraft to stop the aircraft, when the monitored position is found to be inside the first area but not inside the subsection of the first area.

2. The method according to claim 1, further comprising:
if the monitored position found to be is inside the subsection of the first area:
determining, based on the comparison, a lateral deviation from an expected position within the subsection, and
the control unit transmitting information pertaining to the relative deviation to the display to show an indication to the pilot to adjust the course of the aircraft during approach to the stand.

3. The method according to claim 2, wherein a lead-in line extends from the stop position along the approach direction for providing further guidance to the pilot, and wherein the subsection of the first area is defined so as to encompass the portion of the lead-in line being inside the first area.

4. The method according to claim 3, wherein the lateral deviation is a lateral distance between the monitored position and the lead-in line.

5. The method according to claim 1, further comprising:
the control unit comparing the monitored position with a second area, the second area extending outwardly from the front boundary of the first area to define a front boundary of the second area,
if the monitored position is found to be inside the second area: determining, based on the comparison, a lateral deviation from an expected position within the second area, and
the control unit transmitting information pertaining to the relative deviation to the display to show an indication to the pilot to adjust the course of the aircraft during approach to the stand.

6. The method according to claim 1, wherein the position monitoring system is a laser-based position monitoring system adapted to continuously scan the volume at the stand, the volume covering at least the first area.

7. The method according to claim 1, wherein the monitored position pertains to the position of the nose of the approaching aircraft.

8. The method according to claim 1, wherein the extension of the first area and/or the extension of the subsection of the first area is determined based upon one or more from the list of: dimensions of an aircraft expected to approach the stand, dimensions of the aircraft approaching the stand, dimensions of aircrafts at neighboring stands, an approach direction from which an aircraft approaches the stand area, and a lead-in line assigned to the approaching aircraft.

9. The method according to claim 8, wherein determining the extension of the subsection of the first area includes determining a lateral dimension and/or a longitudinal dimension thereof, the dimensions being determined such that sufficient clearance is provided to the approaching aircraft.

10. The method according to claim 1, wherein the extension of the first area and/or the extension of the subsection of the first area can be adjusted during an approach of the aircraft.

11. The method according to claim 10, wherein said adjusting of the extension(s) is determined based on one or more from: dimensions of aircrafts at neighboring stands, positions of aircrafts at neighboring stands, and the monitored position of the approaching aircraft.

12. A non-transitory computer-readable medium comprising computer code instructions which when executed by a device having a processor cause the processor to perform a method comprising:
monitoring, by the position monitoring system, a position of the approaching aircraft within a volume at the stand, the volume having a longitudinal extension along an approach direction towards an expected entrance position of the aircraft;
comparing, by the control unit, the monitored position with a first area, the first area enclosing the stop position and extending along the approach direction to define a front boundary facing the approaching aircraft, and a size and a position of the first area being determined based on identification information of the approaching aircraft;
comparing, by the control unit, the monitored position with a subsection of the first area, the subsection enclosing the stop position and extending along the approach direction to meet a portion of the front boundary of the first area, and a size and a position of the subsection being determined based on identification information of the approaching aircraft, wherein the subsection shares a portion of its boundaries with the first area, the shared portion being a portion of the front boundary of the first area;
transmitting, by the control unit, information to the display to show an indication to the pilot of the approaching aircraft to proceed approaching the stand, when the monitored position is found to be inside the subsection of the first area; and
transmitting, by the control unit, information to the display to show an indication to the pilot of the approaching aircraft to stop the aircraft, when the monitored position is found to be inside the first area but not inside the subsection of the first area.

13. An aircraft docking system for guiding a pilot of an approaching aircraft to a stop position at a stand, the aircraft docking system comprising:
a position monitoring system arranged to monitor a position of an approaching aircraft within a volume at the stand, wherein the volume has a longitudinal extension along an approach direction towards an expected entrance position of the aircraft,
a display for providing instructions to the pilot of the approaching aircraft, and
a control unit operatively connected to the position monitoring system and the display,
wherein the position monitoring system is configured to monitor a position of the approaching aircraft within a volume at the stand, the volume having a longitudinal extension along an approach direction towards an expected entrance position of the aircraft,
wherein the control unit is configured to:
compare the monitored position with a first area, the first area enclosing the stop position and extending along the approach direction to define a front boundary facing the approaching aircraft, and a size and a position of the first area being determined based on identification information of the approaching aircraft;
compare the monitored position with a subsection of the first area, the subsection enclosing the stop position and extending along the approach direction to meet a portion of the front boundary of the first area, and a size and a position of the subsection being determined based on identification information of the approaching aircraft, wherein the subsection shares a portion of its boundaries with the first area, the shared portion being a portion of the front boundary of the first area;
transmit information to the display to show an indication to the pilot of the approaching aircraft to proceed approaching the stand, when the monitored position is found to be inside the subsection of the first area; and transmit information to the display to show an indication to the pilot of the approaching aircraft to stop the aircraft, when the monitored position is found to be inside the first area but not inside the subsection of the first area.

\* \* \* \* \*